United States Patent
Satran et al.

(10) Patent No.: US 6,430,183 B1
(45) Date of Patent: Aug. 6, 2002

(54) DATA TRANSMISSION SYSTEM BASED UPON ORTHOGONAL DATA STREAM MAPPING

(75) Inventors: Julian Satran, Haifa; Efraim Zeidner, Kiryat-Haim; Benny Rochwerger, Haifa; Kenneth M. Nagin, D.N. Nazareth Ilit; Itamar Gilad, Kyriat Haim, all of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/127,153

(22) Filed: Jul. 31, 1998

(30) Foreign Application Priority Data

Sep. 18, 1997 (EP) .............................................. 97480063

(51) Int. Cl.[7] ................................................ H04Q 1/00
(52) U.S. Cl. ........................ 370/389; 370/349; 370/465; 370/504
(58) Field of Search ................................ 370/328, 349, 370/389, 392, 394, 395, 465, 468, 470, 473, 504, 505, 395.6, 395.61, 395.62, 395.63, 395.64, 395.65, 506

(56) References Cited

U.S. PATENT DOCUMENTS 5,668,803 A * 9/1997 Tymes et al. ............... 370/349
5,751,723 A * 5/1998 Vanden Heuvel et al. .. 370/504
6,172,972 B1 * 1/2001 Birdwell et al. ............ 370/349

* cited by examiner

Primary Examiner—Douglas Olms
Assistant Examiner—Shick Hom
(74) Attorney, Agent, or Firm—Scott W. Reid (57) ABSTRACT

A data transmission system, including a plurality of transmitters for transmitting a stream of multiplexed packets over a broadband channel, the packets being constructed from a stream of variable length data blocks, each of the blocks originating from different sources. The system also includes a plurality of receivers for receiving the stream of packets from the broadband channel and reconstructing the stream of variable length data blocks. The data blocks are distributed over one or more packets. The packets also include a packet header having a source identifier (SID) for identifying the source of the packet, and the first of the packets further including a block header having a block identifier (BID) for identifying the data block being transmitted.

34 Claims, 7 Drawing Sheets

DATA TRANSMISSION SYSTEM BASED UPON ORTHOGONAL DATA STREAM MAPPING

FIELD OF THE INVENTION

The present invention relates to transmission networks of the type wherein a plurality of transmitters are transmitting streams of data frames over a broadband channel to a plurality of receivers, and relates particularly to a data transmission system using an orthogonal mapping of blocks and data streams into packets.

BACKGROUND OF THE INVENTION

Today's communication systems are capable of providing digital communication over a broadband channel at data rates far exceeding 30 Mbits/s. The frames of data transmitted over such a channel are typically of fixed length. Interface devices provided at the receiving end of the channel collect the transmitted data frames, then forward these frames to a destination computer where they are then converted into logical blocks of data for use by the computer's software applications. An illustration of this method of transmission is the TCP/IP architecture used to transmit data over the Internet, in which the frames received by an interface device are encapsulated into IP packets which are then utilized by TCP/IP applications.

One disadvantage of this type of transmission system is the inability of today's interface devices to independently process frame data. Current interface devices must interrupt the destination computer each time a frame is received so that its software can convert these frames into useful logical blocks of data. Such direct handling of frame data by the computer's software has proven to be an inefficient use of CPU time. Thus, there is a need to translate frame data into useful data blocks directly within the network interface to improve the communication system described, in order to relieve the computer of this inefficient task of frame conversion.

Another shortcoming of present day network interfaces is their inefficient support of multicast data reception. This inefficiency results from a limited capability in the network interface to filter hardware addresses. For example, to support the reception of multicast IP datagrams in an Ethernet environment, a network interface must be able to receive packets with addresses that correspond to a particular host's set of IP group addresses. It is the function of the address filter to limit the multicast packets received by the network interface to only those packets having a valid destination address.

Unfortunately, the address filters of many current Ethernet network interfaces can only be configured to recognize a small number of hardware addresses, thus requiring the address filter to be disabled (or "opened up") whenever the number of addresses within a particular group exceeds the limits of the filter. This disabling of the address filter can result in the computer having to inefficiently process data packets not intended for reception by its corresponding network interface. Thus, expanding the function of current address filter technology so as to improve the overall multicast transmission efficiency would be a desirable enhancement to the communication system described above.

A final unfavorable characteristic of the above described communication system relates to the unsecured method in which unicast transmissions are presently carried out over the network. Typically, broadcast of these unicast messages requires that the hardware address of a receiving station be accessible to the public in order to enable address resolution. For example, in TCP/IP, an Address Resolution Protocol (ARP) is used to share hardware addresses between host computers. Each host computer associates an IP address with a corresponding hardware address so that it can be determined to which interface device the frame data is to be forwarded. This public exchange of hardware address information makes it possible for information to be wrongfully intercepted through the use of counterfeit receiver hardware. Thus, devising a method of address resolution, whereby the hardware address of the receiving station need not be publicly disclosed, would be desirable to improve unicast transmission security.

SUMMARY OF THE INVENTION

Accordingly, the main object of the invention is to provide a data transmission system, wherein multiple computers can communicate to one another over a broadband channel using transmitters and receivers, each of which exchanges logical blocks of data that are carried over the channel in streams of frames.

Another object of the invention is to provide a data transmission system of the above type, wherein each host computer is attached to the broadband channel by using an intermediary receiving device, said device having the task of transforming frame data into logical data blocks that are then processed by the host computer upon receiving an interrupt signal from the receiving device indicating that the logical data blocks have been stored in the computer memory.

Another object of the invention is to provide a data transmission system of the above type, wherein multicast address filtering capability is expanded using a block identifier located within the received data packet itself that can be both masked and pattern matched against group address templates available to the receiving device.

Another object of the invention is to provide a data transmission system of the above type, wherein during unicast data transmission, unicast addresses are not publicly broadcast over the network, such that only authorized transmitters and the intended receiver itself possess the unicast address.

Therefore, the invention relates to a data transmission system, wherein a first plurality of transmitters transmits data packets over a broadband channel to a second plurality of receivers, in which each transmitter provides a stream of fixed-length packets constructed from a stream of variable length data blocks, each possibly originating from a different source, said packets being multiplexed amongst the various transmitters prior to being transmitted over the broadband channel.

In the preferred embodiment; transmitted data blocks are distributed over one or several fixed length packets, each packet comprising a packet header, having a source identifier that identifies the transmitting source, and the transmitted data itself. The first packet of any given transmitted data block also contains a block identifier that identifies the block being transmitted.

The preferred embodiment also permits multiple transmitters to transmit data concurrently over the broadband channel so long as each transmitter sends packets in the sequence that corresponds to their order within the data block. The packets may be interleaved and multiplexed on the broadband channel, however, each receiver is responsible for identifying packets belonging to each source or transmitter using the source identifier and reformatting the packets received into data blocks using the block identifier.

Thus, the receiver must be capable of filtering through multiple packets originating from different transmitters and transforming them back into data blocks.

BRIEF DESCRIPTION OF THE DRAWINGS

The objects and other features of the invention will be made clear in reading the following description of the preferred embodiment in reference to the accompanying drawings, wherein.

DETAILED DESCRIPTION OF THE INVENTION

Figure 1:
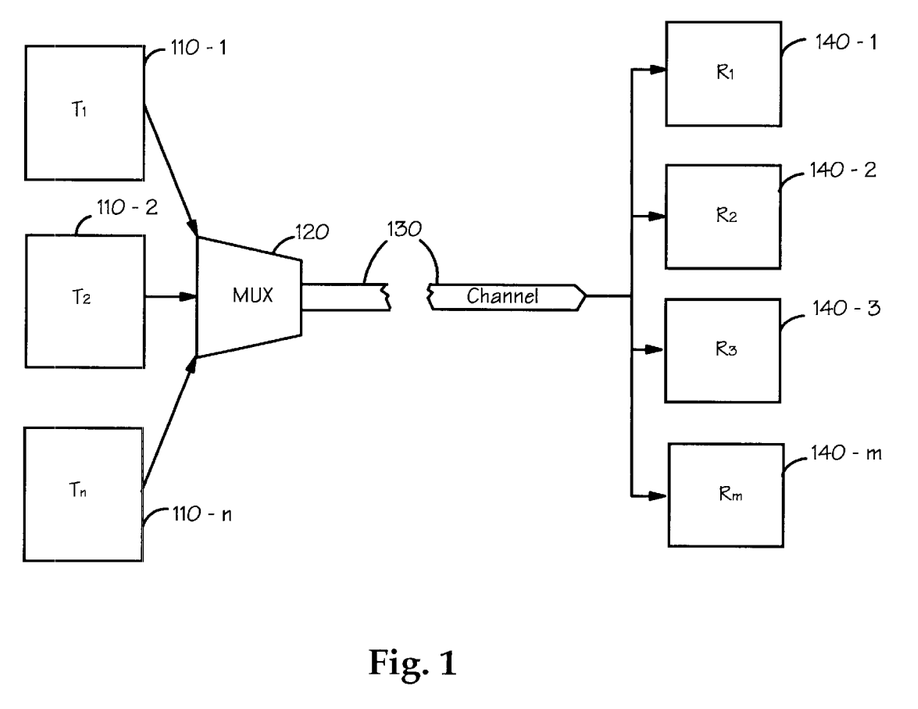
FIG. 1 is a block diagram depicting a data transmission system according to the invention.

A data transmission system 100 according to the present invention is illustrated in FIG. 1. The system comprises a plurality of transmitters 110 that transmit data over a broadband channel 130 to multiple receivers 140. The transmitters provide a flow of packets, preferrably a fixed length, constructed from streams of variable length data blocks, each data block possibly originating from a different source (such as from multiple host computers connected to the transmitter—not shown), that are first multiplexed by multiplexer 120 before being transmitted over the channel 130. The transmitted packets are then reassembled into logical data blocks by receivers 140 for use by various software applications running on one or more host computers (not shown) connected to each of the receivers. Although transmitter and receiver are referred to separately throughout this specification, one skilled in the art will recognize that the functions can operate simultaensously as a transceiver function.

Multiplexer 120 can be of any type in compliance with the broadband channel 130 employed. In the preferred embodiment, multiplexer 120 conforms with Digital Video Broadband (DVB) channels; furthermore, the multiplexing function can be integrated into the transmitters. Broadband channel 130 can be any high speed media that facilitates the transfer of data, voice and video at rates of 1,544 Mbps or higher.

Figure 2:
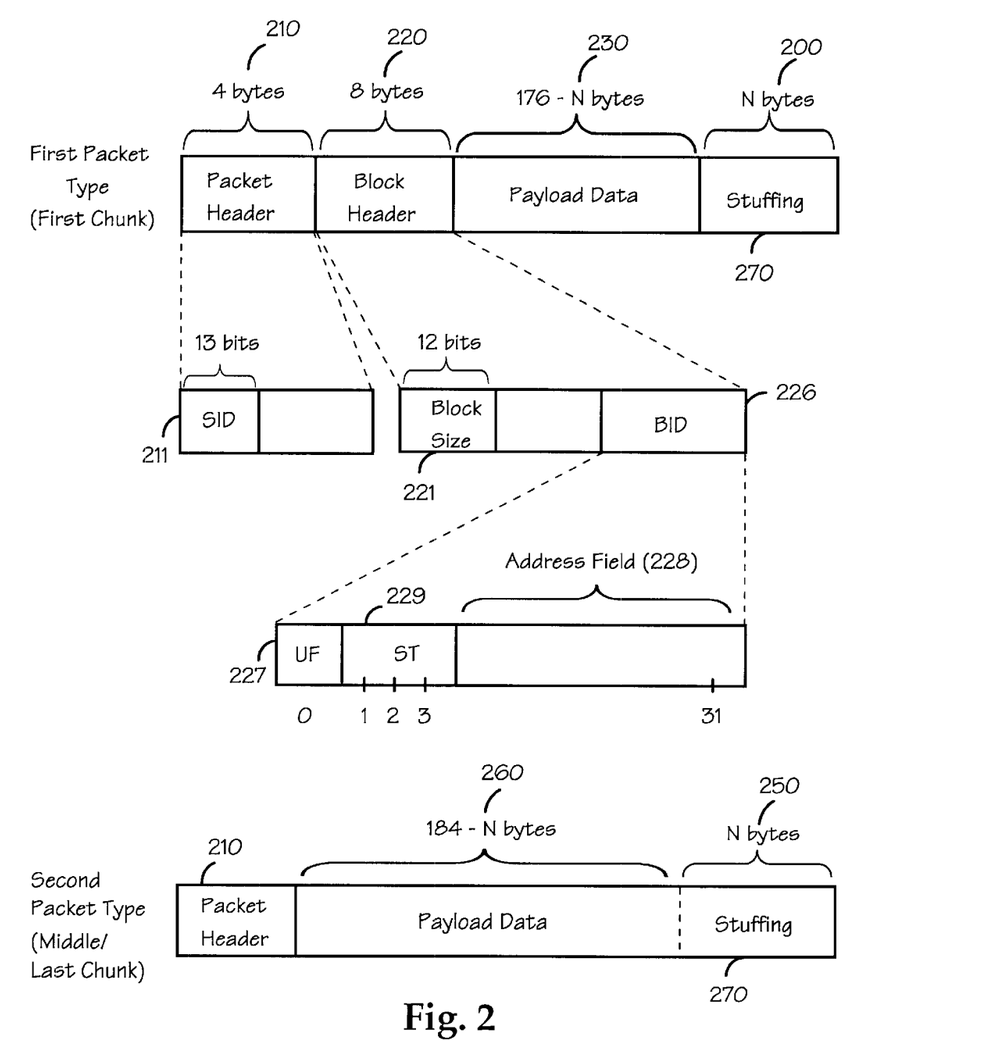
FIG. 2 is a detailed representation of a fixed-length packet transmitted over the broadband channel in accordance with the preferred embodiment of the invention.

In the event that frequency division multiplexing (FDM) is used to transfer data across the channel as in the case of cable TV transmissions, modems (not shown) are required at both the transmitting and receiving ends of the channel 130 in order to modulate the digital transmission and demodulate the received analog signal. In addition, data transmission system 100 depicted in FIG. 1 can be applied to DVB satellite transmission by implementing European Telecommunications Standard (ETS) 300–421 and ETS 300–429 as digital broadcasting systems for television sound and data services with modulation for 11/12 GHz satellite services.
Packet Structure FIG. 2 depicts the packet structure used to transmit data over broadband channel 130. Recall that transmitter 110 constructs these fixed length packets from variable length data blocks originating from either a single source or from several sources connected to the transmitter, after which the packets from the various transmitters are multiplexed by multiplexer 120 prior to being transmitted over channel 130.

In the preferred embodiment, the packet length is fixed at 188 bytes (note that this size can be made arbitrarily different without affecting the invention). Although the packets are fixed in size, their structure varies as a result of both the need to demarcate the start of a new block of data and the need to accommodate varying data chunk sizes. Thus, packets are categorized into two main types, namely, a first type containing First Chunk 200 and a second type containing Middle/Last Chunk 250.

The packet corresponding to First Chunk 200 contains a 4 byte Packet Header 210 (as do all of the packets) that includes a 13 bit Source Identifier (SID) 211 used in identifying common logical sources from amongst the various host computers that may be connected to any given transmitter. This header structure is similar to that used in Moving Picture Experts Group (MPEG) packets. In addition to the packet header, First Chunk 200 also contains an 8 byte Block Header 220, the first 4 bytes of which includes a 12 bit Block Size field 221 containing the size, in bytes, of the data block being transmitted, with the remaining 4 bytes of Block Header 220 being reserved for Block Identifier (BID) 226, used by a receiver to identify given blocks of data. The remaining 176 bytes of First Chunk 200 is made up of Payload Data Field 230, used to store the transmitted data.

BID 226 is comprised of two components, one flag bit (bit 0) labeled Unicast Flag (UF) 227, and Address Field 228 made up of the remaining 31 bits of BID 226. Unicast Flag 227 is used by a receiver to determine whether the block being transmitted is a unicast or a multicast transmission block.

In the preferred embodiment, a BID having a UF equal to "1" is deemed to represent the transfer of a unicast transmission block, whereas a BID having a UF equal to "0" represents the transfer of a multicast transmission block. When UF 227 is equal to "1", thus indicating the transfer of a unicast transmission block, the entire 31 bits of Address Field 228 contains the unique unicast address for the intended receiver hardware. This mode of operation is discussed in further detail below in the section entitled "Unicast Addressing Security".

Again according to the preferred embodiment, when UF 227 is equal to "0", the transmission of data is said to multicast, whereby transmitted data blocks are addressed to multiple receivers that are a subset of a larger group of receivers. In this mode of operation, Address Field 228 can be masked and pattern matched against address templates in order to filter out unwanted data packets. In addition, bits 1 through 3 of Address Field 228 can concurrently be used as a Service Type (ST) Field 229 allowing groups of receivers to be addressed based upon their service mode. The following section entitled "Multicast Group Address and Service Type Filtering" discusses these methods of multicast address filtering in further detail.

Like the packet representing First Chunk 200, the packet corresponding to Middle/Last Chunk 250, of FIG. 2, is comprised of both a Packet Header and a Payload Data Field. While the packet header structure is identical between the two packet types, both a variable length Payload Data Field 260 and the omission of a block header distinguishes Middle/Last Chunk 250 from First Chunk 200. Variable length Payload Data Field 260 is necessary when the remaining data to be transmitted is smaller than 184 bytes. In such situations, because the packet length must remain fixed at 188 bytes, any unused portion of the packet is necessarily padded with Stuffing Bits 270.

Note that if the size of the transmitted data block is smaller than 176 bytes, only one packet is needed for transmission of this data. In these situations, either the remainder of the packet can be padded with stuffing bits, or alternatively, a second data block intended for the same receiver (or group of receivers) can be transmitted by incorporating a second Block Header 220 into the packet. Thus, packets may contain a plurality of block header and payload data sections depending on the size of the data blocks that are to be transmitted.

Multicast Group Address and Service Type Filtering

Recall from the above discussion that when Unicast Flag 227 is equal to a "0", the data block being transferred is a multicast transmission block intended for reception by a subset of the available receivers along the network. Because Address Field 228 is not needed to identify a uniquely designated receiver address while operating in this mode, its contents can be exploited to implement both multicast group address filtering as well as service type filtering. The first 3 bits of Address Field 228 are designated as Service Type (ST) Field 229 to facilitate the latter of these filtering modes.

Multicast group address filtering is accomplished in the receiver by comparing bits 1 though 31 in Address Field 228 of the BID with an internally stored bit map. This bit map is comprised of both a mask bit map and a pattern bit map. The mask bit map is first used to determine the relevant bits in Address Field 228 that represent the addresses of the group of interest, after which those relevant bits are compared against the pattern bit map. If all the relevant bits in Address Field 228 match those of the pattern bit map, the data block is received.

Note that this masking feature enables a receiver to ignore certain bits in Address Field 228 and thus focus only on those bits that form the portion of the address field that defines the group of interest. Masking on all of the bits of Address Field 228 allows a receiver to search for a particular multicast address, while masking off all of the bits in the address field would have the effect of the receiver accepting all multicast addresses.

In addition to the method of multicast group address filtering discussed above, the receiver hardware can further process addresses through the method of Service Type filtering. Service types (or service modes) are used in the transmission system to attach a particular organization or classification to the data that is being transmitted or received. Use of these service modes further expands the processing capabilities of multicast transmission systems by allowing transmitters or receivers, operating within a particular group addressing mode, to concurrently function in a separate service mode that is unique from the service mode of other transmitters or receivers operating within their address group. An example of a product capable of utilizing such service modes is the IBM Advance Cable Communication System (ACCS) which currently supports the services: ACCS Broadcast, IP Unicast and IP Multicast.

Service type filtering is accomplished in the receiver through the use of Service Type Field 229. In the preferred embodiment, this field is 3 bits in length and occupies bits 1, 2 and 3 immediately following Unicast Flag 227 in Block Identifier 226, thus providing eight service indices amongst which various service modes can be designated. The size of Service Type Field 229 can be varied depending on the number of service modes to be supported.

Note that the differentiation between Unicast and Multicast transmission can itself be thought of as producing two service types the latter of which can be divided into still more specific services through the use of Service Type Field 229.

Transmission Sequence

The transmission of logical data blocks over broadband channel 130 of FIG. 1 involves first transforming the logical data stream into packets, preferrably of fixed length, then multiplexing those packets amongst the various transmitters connected to the channel.

Figure 3:
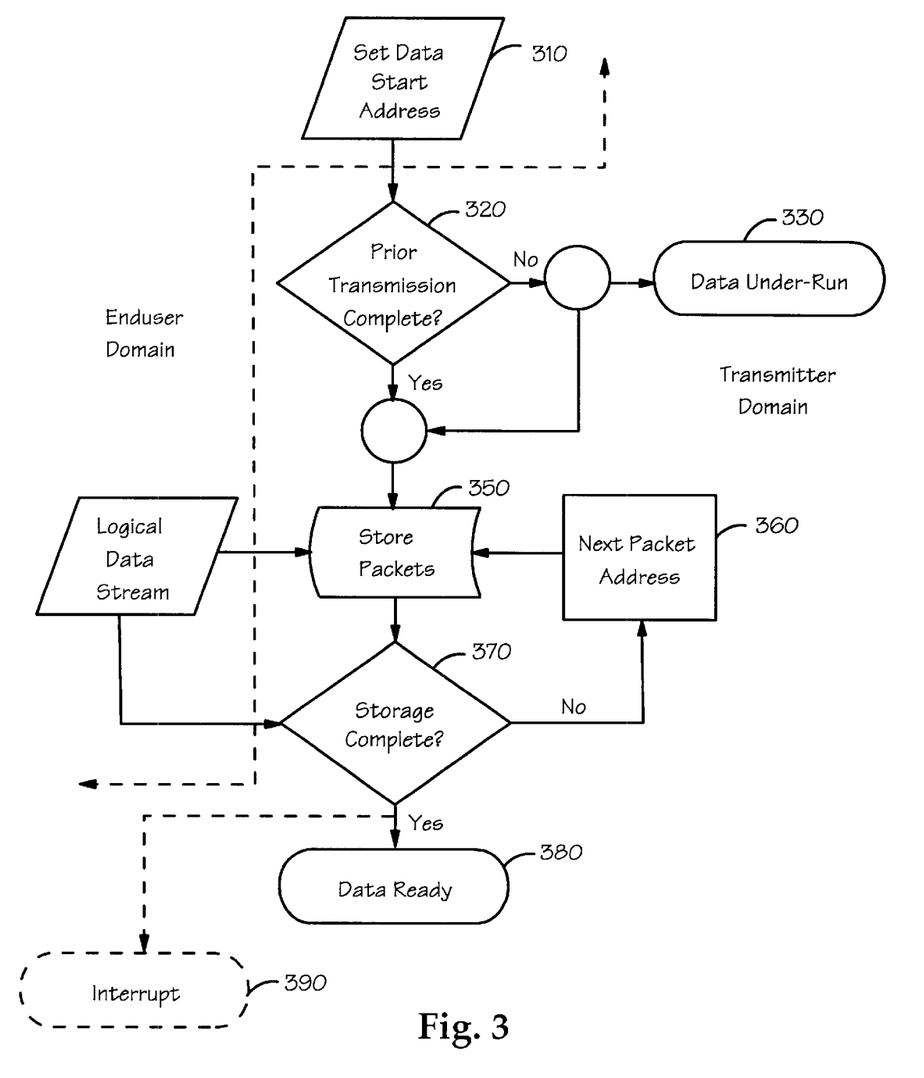
FIG. 3 is a flow diagram depicting the storage of logical block data into fixed length packets by the transmitter.

FIG. 3 depicts the first of these steps carried out by the transmitter, namely the transformation of a data stream into fixed length packets of the type depicted in FIG. 2. The transformation is initiated by an enduser system (hereinafter called "enduser") sending a SET DATA START ADDRESS command to its corresponding transmitter. This command contains the start address of the first memory location in a linked list buffer chain. The transmitter then constructs fixed length packets from the Logical Data Stream sent by the enduser, storing each the packets in memory locations along the linked list buffer chain. After completion of the transformation, the transmitter sets an internal Data Ready flag indicating that the data stream is ready for transmission. Alternatively, the transmitter can send an interrupt signal to its corresponding enduser indicating that the transformation into packets is complete. A Data Under-Run flag is set in the transmitter if a second SET DATA START ADDRESS command is received by the transmitter prior to completing a previous transmission.

Figure 4:
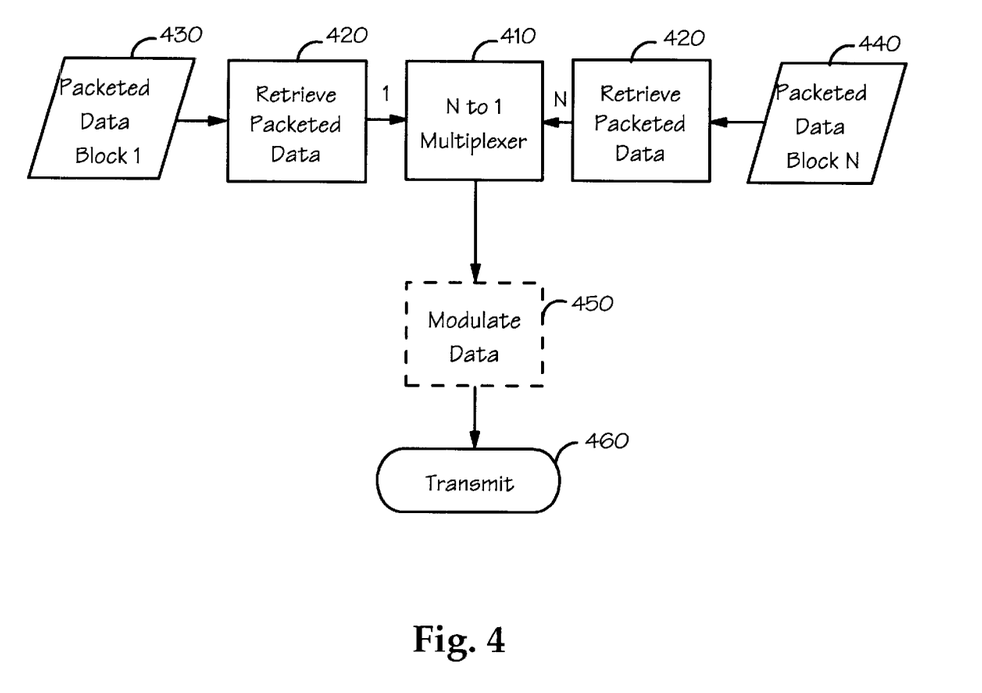
FIG. 4 is a flow diagram depicting the transmission of data streams, each possibly originating from various sources, over a single broadband channel.

Once transformed into fixed length packets, the data stream is then transmitted over the broadband channel as depicted in FIG. 4. The transmitter first retrieves the packeted data by reading along the appropriate linked list buffer. The packets are then multiplexed amongst the various data streams being transmitted prior to being launched onto the broadband channel. The data can optionally be modulated prior to transmission.

Receive Data Sequence

Figure 5A:
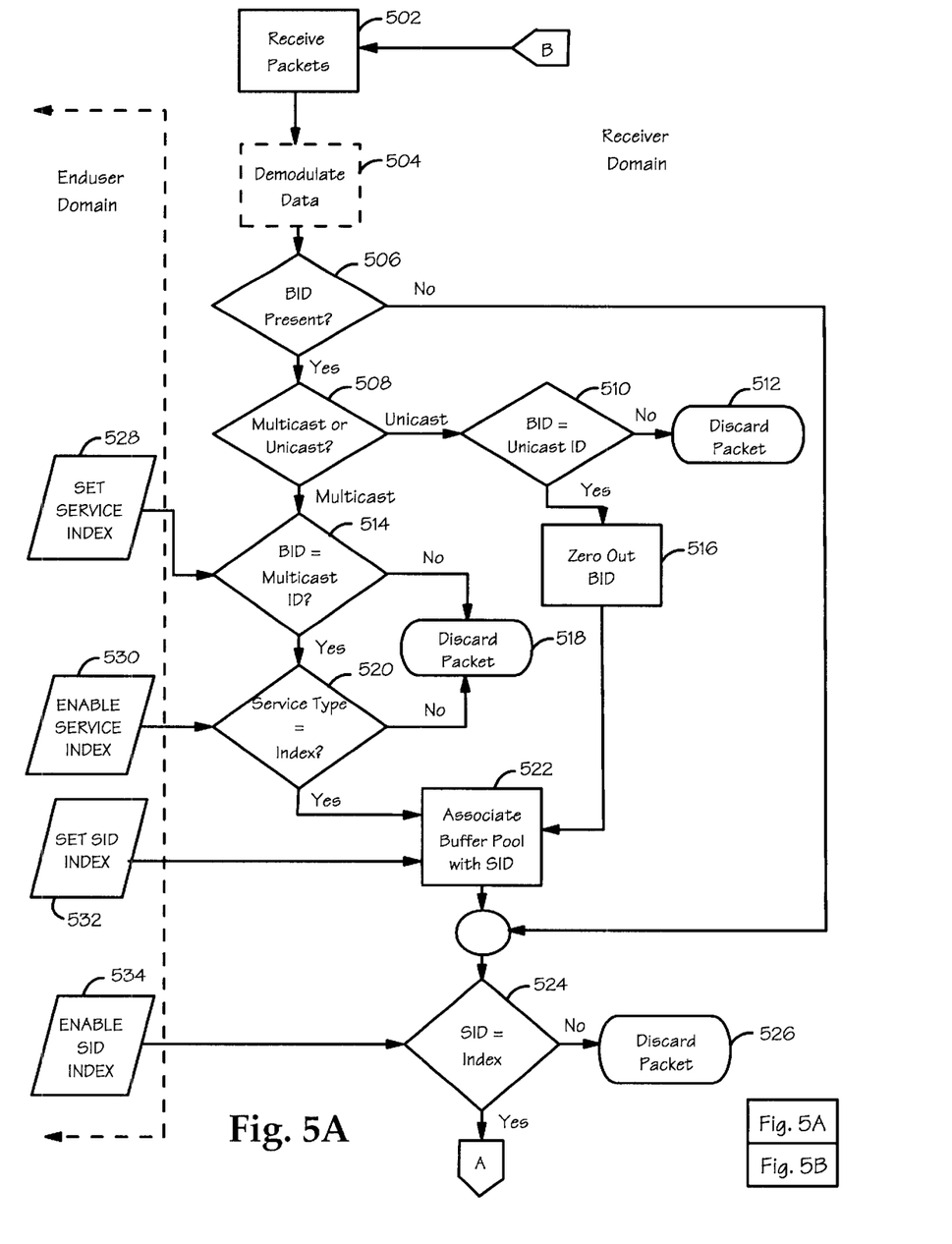
FIGS. 5(a)–(b) are flow diagrams depicting the process for receiving data in accordance with the preferred embodiment of the invention.
Figure 5B:
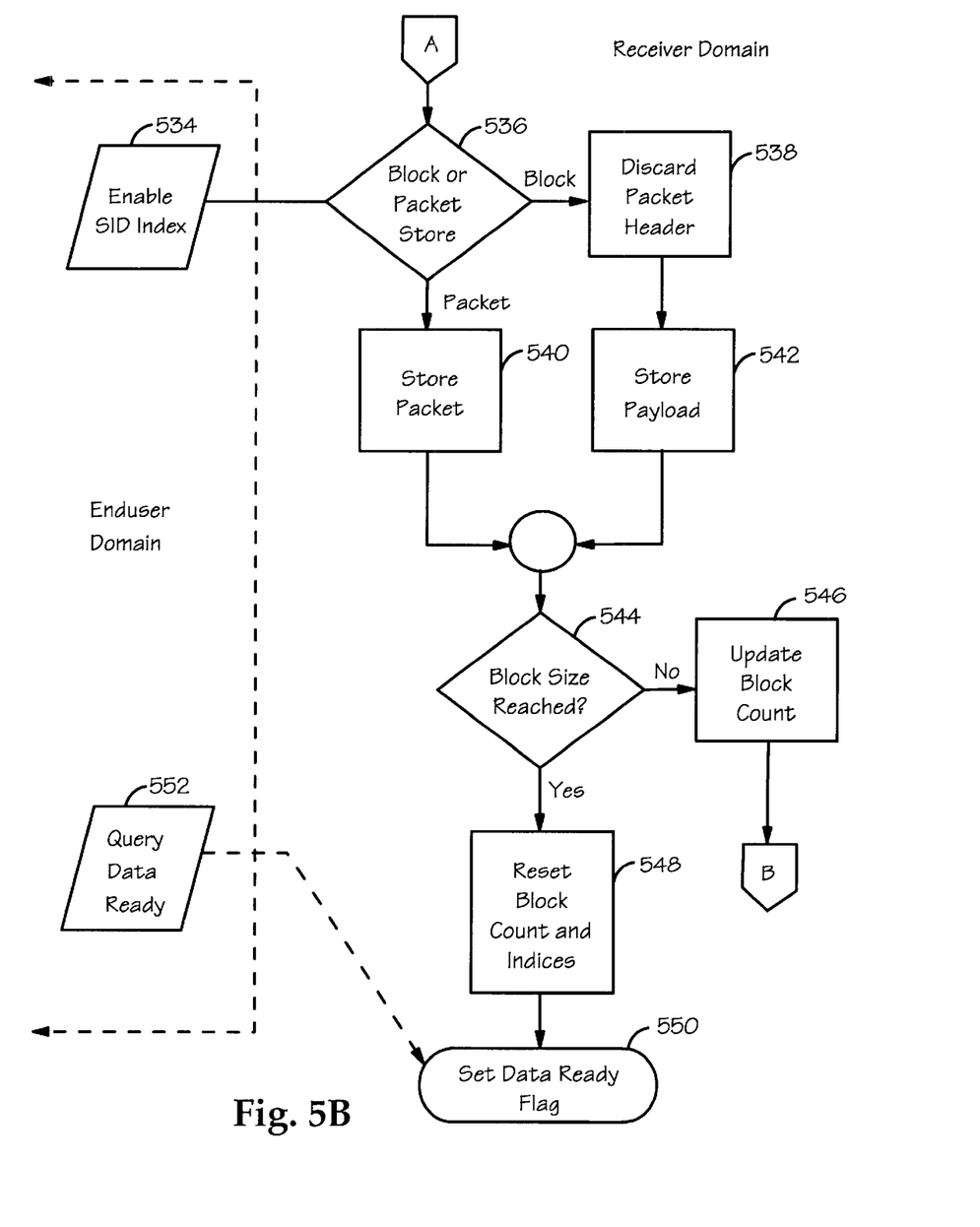

The receiver performs three primary tasks in retrieving information from the broadband channel. The first task is to filter the received data for desired packets by examining both the source ID, contained in the packet header of all received packets, and the destination address contained in the block identifier of the first packet in the data stream. Next, the receiver assigns a buffer pool, which exists in the enduser memory, to each unique source identifier contained in the group of filtered packets. Lastly, the receiver processes the filtered packets by either translating them back into the original logical data block, or by storing the packeted information, as is, in the enduser memory for later translation. The method used to accomplish these tasks in the receiver of the preferred embodiment is depicted in FIG. 5.

Following receipt of a packet 502, the data is first demodulated in step 504, provided the information was optionally modulated prior to its transmission over the broaddband channel. Filtering of destination addresses begins with step 506, where it is determined whether the received packet contains a block identifier. Should the packet contain a block identifier, steps 508 through 520 carry out the tasks of unicast and multicast group and service type address filtering discussed above. The enduser uses the commands SET SERVICE INDEX and ENABLE SERVICE INDEX, as depicted in steps 528 and 530 respectively, to instruct the receiver how the destination addresses are to be filtered.

The SET SERVICE INDEX command is used to configure address filtering in the receiver to either unicast or multicast mode, and in the case of multicast filtering, to associate a corresponding multicast mask and group address pattern with the index. Should the desired addressing mode be multicast, the receiver uses the multicast mask and group address to pattern match against the address contained in the block identifier. The ENABLE SERVICE INDEX command is used to allow further filtering of multicast group addresses by service type as discussed earlier. If the SET SERVICE INDEX command configures the receiver to operate in unicast addressing mode, the BID is compared against the receiver's unique internal unicast address, and the multicast mask and address pattern are ignored.

The receiver uses the information in the SET SID INDEX command, issued by the enduser, to associate a start address of a linked list buffer pool with a particular source identifier of the received data packet 522. The receiver will later use this start address to store the data that is contained in the various packets received, and having the given source ID, in the buffer pool in order to facilitate re-assembly of the packeted data into a logical data block. Although this association is depicted at step 522 in the receive data path flow diagram, the step can occur at any point in the process prior to the filtering of the SID in step 524. The operation of storing the received data in the buffer pool is described in further detail in the following section entitled "Buffer Management".

Whether the received packet contained a valid destination address and thus successfully traversed the various filtering mechanisms, or the packet contained no BID at all, the next step in the receive process is to filter the packet based upon its source identifier. Both the SET SID INDEX command 532, which identifies enduser-desired source ID's to the receiver, and the ENABLE SID INDEX command 534 which enables source ID filtering, are used by the receiver to facilitate SID filtering as depicted in step 524. If a packet contains a source ID equal to an SID identified by a previously received SET SID INDEX command, information from the packet will be processed and stored in the buffer pool that was associated with the source ID in step 522.

The enduser controls the processing and storage of the packeted data again through the use of the ENABLE SID INDEX command 534. In addition to enabling source ID filtering in the receiver, this command determines whether the packeted data is to be stored in the buffer pool in either block or packet format. In block mode, the receiver stores only the data portion of the packet, which is contained in its payload section, from which the complete transmission block can later be assembled. In packet mode, the receiver simply fills the buffer pool with the entire contents of the packet, leaving the assembly of the data block to the enduser. In either storage mode, the destination address contained in the BID of the first packet in the data stream is stored in the first 32 bits of the buffer pool. Note, that for security reasons (as will further be discussed in the section below entitled "Unicast Addressing Security") any unicast addresses received are "zeroed out" in step 516 prior to storage.

The process of storing packets or payload data in the buffer pool continues for each valid source ID received until the block size, as depicted in field 221 of FIG. 2, for the logical data block is reached. At this time, the receiver generates a Data Ready interrupt which indicates to the enduser that the logical data block is ready to be read from the buffer pool, or, while operating in packet mode, that the stored packets are ready to be translated into a logical data stream. Alternatively, a Data Ready flag, that is possibly a portion of a status map having one bit allocated per valid SID, can be polled by the enduser using the QUERY DATA READY command to determine when a particular logical data block is ready for processing by enduser applications.

Buffer Management

Figure 6:
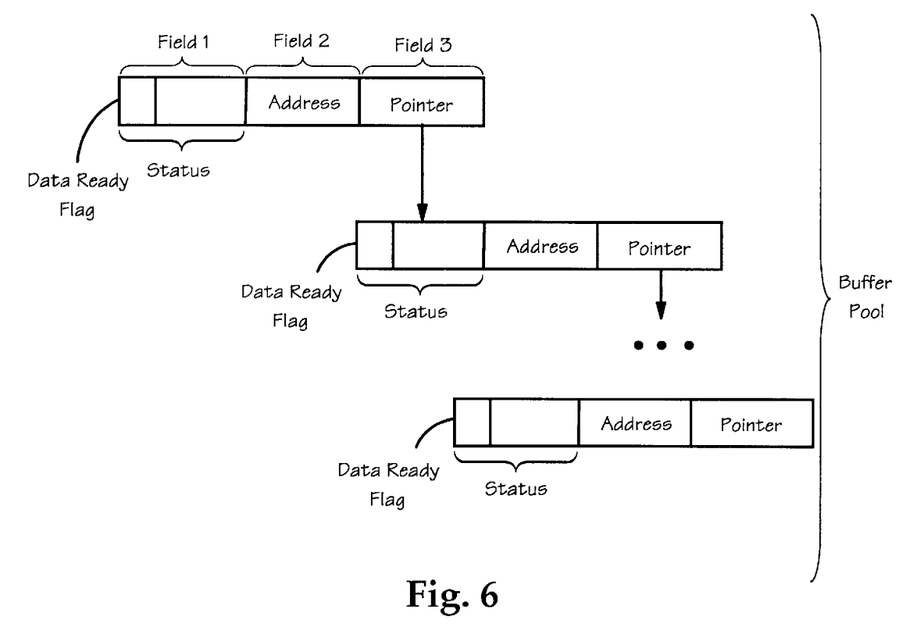
FIG. 6 depicts the method of buffer management utilized by the receiver of the preferred embodiment.

As was described above, the enduser communicates an association of a buffer pool with a particular SID to the receiver through the use of the SET SID INDEX command. This buffer pool (allocated in the memory of the enduser, e.g. the PC storage) is formed from a linked list of nodes each having three fields as depicted in FIG. 6. In the preferred embodiment, Field 1 is used to provide information regarding the status of the buffer as well as some receiver exception status, the Data Ready flag, contained therein, being most relevant to the invention. Field 2 contains a pointer to a physical address, located in the enduser memory, in which the received data can be stored. Finally, field 3 contains a pointer to the physical address of the next node in the linked list buffer.

Thus, when the receiver stores data in the buffer pool in either packet mode or block mode form, it first stores the information in the address provided in Field 2 of the link node, then determines the physical address of the next node in link list from Field 3. This process, as now depicted in FIG. 5, is continued until the entire data block has been stored in the buffer pool, at which time the receiver resets the block count and service type index for the current SID in step 548, then updates the Data Ready flag in step 550, setting the flag equal to a "1" (such assignment being entirely arbitrary) to indicate that the buffer is ready to be read by the enduser. The enduser then reads the logical data block from its memory by traversing the chain of link nodes, simultaneously freeing the buffer by setting each Data Ready flag back to "0" (again polarity being arbitrary.)

Unicast Addressing Security

As mentioned above, another object of the invention is to support unicast data transmission while limiting access of the destination address to only authorized transmitters. Current unicast transmission methods require that the unicast address be made publicly available, thus allowing interception of information that is destined for a particular enduser by unauthorized endusers through the use of counterfeit receiver hardware.

The following features enable unicast address anonymity to be maintained in the system. First, the unicast address register is hardwired into the receiver hardware rendering the register non-programmable, and thus preventing unauthorized individuals from reading or altering the address. This unique address is assigned during manufacturing and cannot be subsequently read or altered by any individuals. Second, the unicast address is "zeroed out" in the enduser memory once matched against the receiver's internally hardwired register value. This prevents individuals from dumping or scanning the enduser memory when a valid unicast transmission is received in order to determine the receiver's unique unicast ID. Lastly, the unicast address is associated with the receiver hardware serial number but is not identical thereto. While the receiver serial number represents a visible ID which uniquely identifies the hardware component, the unicast address remains a non-visible ID that uniquely identifies the hardware component. This one-to-one correspondence between serial numbers and unicast ID's can be maintained by the manufacturer in a secured database, which can then be used by transmitters to send unicast transmissions to particular receiver hardware.

While the invention has been described in detail herein in accordance with certain preferred embodiments thereof, modifications and changes therein may be effected by those skilled in the art. Accordingly, it is intended by the appended claims to cover all such modifications and changes as fall within the true spirit and scope of the invention.

What we claim is:

1. A data transmission, comprising:
   a plurality of transmitters for transmitting a stream of multiplexed packets over a broadband channel, said packets constructed from a stream of variable length data blocks, each of said blocks originating from different sources;
   a plurality of receivers for receiving from said broadband channel said stream of packets and reconstructing therefrom said stream of variable length data blocks;
   wherein each of said data blocks is distributed in chunks over one or more packets, each of said packets having a packet header with a source identifier SID for identifying the source of said packet, and the first of said packets further comprising a block header having a block identifier BID for identifying the data block being transmitted; and
   wherein said BID further comprises a unicast flag for determining whether the block identified by said BID is forwarded to only one receiver or to a subset of said plurality of receivers, and an address field defining the address of said one receiver or said subset of receivers to which said block is forwarded.

2. The data transmission system according to claim 1, wherein said packets contain more than one data block.

3. The data transmission system according to claim 1, wherein said packets have a fixed length.

4. The data transmission system according to claim 1, wherein said block header further comprises a block size field giving the size in bytes of the blocks being transmitted.

5. The data transmission system according to claim 1, wherein said unicast flag is a single bit, having a first value if the block identified by said BID is forwarded to only one receiver and a second value if said block is forwarded to a subset of receivers.

6. The data transmission system according to claim 1, wherein when said unicast flag indicates that said block is forwarded to only one receiver, said address field defines a unicast address stored in a database in the transmitter of said plurality of transmitters which transmitted said packet and hardwired in said one receiver.

7. The data transmission system according to claim 1, wherein when said unicast flag indicates that said block is forwarded to a subset of receivers, each one of said receivers compares the address field of said BID to an internal bit map.

8. The data transmission system according to claim 7, wherein said address field of said BID comprises a plurality of address bits and said internal bit map further comprises a mask bit map, used to determine the relevant address bits in said BID, and a pattern bit map used to compare against said relevant address bits of said address field.

9. The data transmission system according to claim 7, wherein said address field of the BID further comprises a sub-field defining a service type, enabling each receiver, in said subset of receivers, to monitor said packets received for different service types concurrently with the other receivers in said subset.

10. The data transmission system according to claim 1, wherein each of said receivers further comprise:
    a filter for selecting a group of packets of interest from said stream of packets transmitted over said broadband channel, by examining said block identifier BID of said block header, and by examining said source identifier SID of said packet header;
    a storage manager for assigning a buffer pool to each unique source identifier SID contained in said group of selected packets received, wherein said buffer pool exists in the memory of an enduser connected to the receiver and is addressable by a corresponding linked list; and
    a packet processor for storing said group of selected packets in said buffer pool, wherein the entire contents of said selected packets are stored in said buffer pool when said processor operates in packet mode, and only a payload data portion of said selected packets is stored in said buffer pool when said processor operates in block mode.

11. The data transmission system according to claim 10, wherein each of said receivers further comprise a modem for demodulating said packet stream received over said broadband channel.

12. The data transmission system according to claim 1, wherein each of said transmitters further comprise a queue manager for storing said constructed packets in a buffer pool prior to transmission over said broadband channel, wherein:
    said buffer pool exists in the memory of an enduser connected to the transmitter that is the source of the stream of variable length data blocks from which said packets were constructed;
    said buffer pool is addressable by said transmitter by means of a corresponding linked list; and
    said transmitter sets an internal data ready flag indicating to the enduser that said packets constructed from said stream of variable length data blocks are completely stored in said buffer pool.

13. The data transmission system according to claim 12, wherein said transmitter sends an interrupt to the enduser indicating that said packets constructed from said stream of variable length data blocks are completely stored in said buffer pool.

14. The data transmission system according to claim 12, wherein each of said transmitters further comprise a modem for modulating said packet stream transmitted over said broadband channel.

15. The data transmission system according to claim 12, further comprising a multiplexer connecting said plurality of transmitters to said broadband channel.

16. A stream of packets for carrying variable length data blocks in chunks across a broadband channel, comprising:
    a first packet of a first packet type, said first packet type comprising a packet header with a source identifier SID for identifying the source of said packet, a block header with a block identifier BID for identifying which data block is being propagated, and a payload data field of variable length for storing chunks of said data block;
    a plurality of packets of a second packet type, said second packet type comprising a packet header identical in structure to that of said first packet type, and a payload data field of variable length for storing chunks of said data block; and
    wherein said BID further comprises a unicast flag for determining whether the block identified by said BID is propagated to a single receiver or to a subset of a plurality of receivers, and an address field defining the address of said single receiver or said subset of receivers to which said block is propagated.

17. The stream of packets according to claim 16, wherein said first packet type contains more than one data block.

18. The stream of packets according to claim 16, wherein all said packets have a fixed length, and said payload data field further comprises a stuffing field of variable length to compensate for varying data chunk sizes.

19. The stream of packets according to claim 16, wherein said block header further comprises a block size field giving the size in bytes of the block being propagated.

20. The stream of packets according to claim 16, wherein said unicast flag is a single bit, having a first value if said block is propagated to said single receiver and a second value if said block is propagated to said subset of receivers.

21. The stream of packets according to claim 16, wherein when said unicast flag indicates that said block is propagated to only one receiver, said address field defines a unicast address stored in a database of said source of said packet and hardwired in said single receiver.

22. The stream of packets according to claim 16, wherein when said unicast flag indicates that said block is propagated to a subset of receivers, each one of said receivers compares the address field of said BID to an internal bit map.

23. The stream of packets according to claim 22, wherein said address field of said BID comprises a plurality of address bits and said internal bit map further comprises a mask bit map, used to determine the relevant address bit in said BID, and a pattern bit map used to compare against said relevant address of bits of said address field.

24. The stream of packets according to claim 22, wherein said address field further comprises a sub-field defining a service type, enabling each receiver, in said subset of receivers, to monitor said packets received for different service types concurrently with the other receivers in said subset.

25. A receiver for receiving variable length data blocks carried in a stream of packets over a broadband channel, comprising:
   a filter for selecting a group of packets of interest from said stream of packets, by examining a source identifier SID contained in said packets for identifying the source of said data blocks; and by examining a block identifier BID contained in the first packet of said stream of packets for identifying the data blocks being transmitted by the selected group of packets;
   a storage manager for assigning a buffer pool to each unique source identifier SID contained in said group of selected packets received, wherein said buffer pool exists in the memory of an enduser connected to said receiver and is addressable by a corresponding linked list; and
   a packet processor for storing said group of selected packets in said buffer pool, wherein the entire contents of said selected packets are stored in said buffer pool when said processor operates in packet mode, and only a payload data portion of said selected packets is stored in said buffer pool when said processor operates in block mode.

26. The receiver according to claim 25, further comprising a modem for demodulating said packet stream received over said broadband channel.

27. A transmitter for transmitting variable length data blocks over a broadband channel, comprising:
   a packet builder for constructing a transmittable signal from said data blocks by forming a stream of packets, the first of said packets having a packet header with a source identifier SID corresponding to a source enduser connected to said transmitter, a block header with a block size field and a block identifier BID, said BID having a unicast flag and address field for address resolution, and a payload data field containing a chunk of data from said data blocks, with subsequent packets in the stream having packet headers identical to that of said first packet and payload data fields containing chunks of data from the remainder of said data blocks; and
   a queue manager for storing said stream of packets in a buffer pool prior to transmission over said broadband channel, wherein said buffer pool exists in the memory of said source enduser, said buffer pool is addressable by said transmitter by a corresponding linked list and said transmitter sets an internal data ready flag indicating to the enduser that said packets constructed from said variable length data blocks are completely stored in said buffer pool.

28. The transmitter according to claim 27 wherein said transmitter sends an interrupt to the source enduser indicating that said packets constructed from said variable length data block are completely stored in said buffer pool.

29. The transmitter according to claim 27, further comprising a modem for modulating said packet stream transmitted over said broadband channel.

30. A method for transmitting and receiving variable length data blocks over a broadband channel, comprising the steps of:
   receiving a data start address of a linked list associated with a transmit buffer pool existent in the memory of an enduser that is the source of a data block to be transmitted;
   constructing a transmittable signal from said data block by forming a stream of packets, the first of said packets having a packet header with a source identifier SID corresponding to said source enduser, a block header with a block size field and a block identifier BID, said BID further comprising a unicast flag and address field for address resolution, and a payload data field containing a chunk of said data block, with subsequent packets in the stream having packet headers identical to that of said first packet and payload data fields containing chunks of data for the remainder of said data block;
   storing said stream of packets in said transmit buffer pool;
   notifying said source enduser that said packet stream is ready to be transmitted by setting a data ready flag;
   multiplexing said packets of data with other packet streams to be transmitted over said broadband channel;
   transmitting said packet stream over said broadband channel by reading along the linked list for said transmit buffer pool;
   notifying said source enduser if the transmission of said packet stream is interrupted by the receipt of another data start address by setting a data under-run flag;
   retrieving packets from said broadband channel;
   examining packets received from said broadband channel to determine if they contain said BID;
   determining the addressing mode of those packets having said BID by examining the unicast flag, wherein said unicast flag is a first value if said data block is transmitted to only one receiver, and a second value if said data block is transmitted to a subset of receivers;
   filtering said received packets by unicast address when said unicast flag is the first value, by comparing the address field in said BID with an internally hardwired unicast address, discarding each packet for which the address field in said BID differs from the internally hardwired unicast address and zeroing out the address field in said BID if said address field matches the internally hardwired unicast address;

filtering said received packets by multicast address when said unicast flag is the second value, by masking the address field in said BID with a mask bit map corresponding to a service index received from a destination enduser, comparing the unmasked bits of said address field with a pattern bit map corresponding to said service index, and discarding each packet for which the masked address field in said BID differs from said pattern bit map;

filtering said received packets by service type when said unicast flag is the second value and when the destination enduser enables service type filtering, by comparing bits 1, 2, and 3 of said address field with a series of service type bits in said pattern bit map, and discarding each packet for which bits 1, 2, and 3 of said address field differ from said series of service type bits of said pattern bit map;

receiving an SID index from said destination enduser defining the SID of the packets to be received, the mode of storage for said SID and the start address of a receive buffer pool for storing said SID, wherein said buffer pool exists in the memory of said destination enduser and is addressable using a corresponding linked list;

filtering said received packets by source identifier SID when the destination enduser enables said SID index, by comparing the SID of the received packets with that of the SID index and discarding each packet for which the SID differs from that of the SID index;

storing the information contained in the filtered packets in said receive buffer pool, wherein the entire contents of the filtered packets are stored in the receive buffer pool when said SID index specifies packet mode storage, and only the data chunk portion of the filtered packets is stored in the receive buffer pool when said SID index specifies block mode storage;

comparing the size of the data chunks stored in said receive buffer pool with the value contained in the block size field of said BID;

updating a block size counter to equal the size of the data chunks stored for the data block thus far if said counter does not yet equal the value contained in the block size field of said BID; and notifying said destination enduser that the data block is ready to be retrieved from said receive buffer pool by setting a data ready flag to 1, wherein said destination enduser sets the data ready flag to 0 after retrieving said data block.

31. The method for transmitting and receiving according to claim 30, wherein said step of notifying the source enduser that said packet stream is ready to be transmitted is accomplished by sending an interrupt signal to the source enduser.

32. The method for transmitting and receiving according to claim 30, wherein said step of notifying the destination enduser that the data block is ready to retrieved from said receive buffer pool is accomplished by sending an interrupt signal to the destination enduser.

33. The method for transmitting and receiving according to claim 30, further comprising the step of modulating said transmittable signal containing said stream of packets prior to transmission over the broadband channel.

34. The method for transmitting and receiving according to claim 30, further comprising the step of demodulating said transmittable signal containing said stream of packets after retrieval from the broadband channel.

* * * * *